United States Patent
D M et al.

(10) Patent No.: US 10,659,336 B1
(45) Date of Patent: May 19, 2020

(54) SERVER ACCESS TIMES

(71) Applicant: Hewlett Packard Enterprise Development LP, Houston, TX (US)

(72) Inventors: Vikas D M, Bangalore (IN); Santosh Arunachalam, Bangalore (IN); Syed Ahmed Mohiuddin Peerzade, Bangalore (IN); Praveen Kumar Shimoga Manjunatha, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 16/176,033

(22) Filed: Oct. 31, 2018

(51) Int. Cl.
*H04L 12/26* (2006.01)
*H04L 12/911* (2013.01)
*H04L 29/08* (2006.01)

(52) U.S. Cl.
CPC ............ *H04L 43/10* (2013.01); *H04L 47/70* (2013.01); *H04L 67/1025* (2013.01)

(58) Field of Classification Search
CPC ...... H04L 43/10; H04L 67/1025; H04L 47/70
See application file for complete search history.

(56) References Cited

U.S. PATENT DOCUMENTS

| | | | | |
|---|---|---|---|---|
| 5,862,338 A * | 1/1999 | Walker | ............ | H04L 49/351 709/224 |
| 6,564,261 B1 | 5/2003 | Gudjonsson et al. | | |
| 8,117,279 B2 | 2/2012 | Kumar et al. | | |
| 9,391,843 B1 | 7/2016 | Saha et al. | | |
| 2004/0068589 A1* | 4/2004 | Witkowski | ............ | H04L 12/467 709/249 |
| 2008/0037050 A1* | 2/2008 | Sasaki | ............ | G06F 13/102 358/1.13 |
| 2016/0014073 A1* | 1/2016 | Reddy | ............ | H04L 67/38 713/2 |
| 2017/0149931 A1 | 5/2017 | Lochhead et al. | | |
| 2018/0351819 A1* | 12/2018 | Mohanram | ......... | H04L 41/0636 |
| 2018/0367413 A1* | 12/2018 | Kompella | ............ | H04L 41/145 |
| 2019/0028400 A1* | 1/2019 | Kommula | ............ | G06F 9/5088 |

FOREIGN PATENT DOCUMENTS

| WO | WO-0114989 | 3/2001 |
|---|---|---|
| WO | WO-2018103019 | 6/2018 |

OTHER PUBLICATIONS

Configure User Mapping for Terminal Server Users, (Web Page), Retrieved Aug. 16, 2018, 16 Pgs.

* cited by examiner

*Primary Examiner* — Michael Won
(74) *Attorney, Agent, or Firm* — Brooks, Cameron & Huebsch, PLLC

(57) ABSTRACT

Example implementations relate to server access times. A computing device may comprise a processing resource; and a memory resource storing non-transitory machine-readable instructions to cause the processing resource to: determine a media access control (MAC) address of a server; poll a top of rack (TOR) switch connected to the server to capture a packet; determine a source MAC address using the captured packet; determine, based on the source MAC address, an identity of a user computing device; and log, based on a time included in the captured packet, a time the user computing device last accessed the server.

19 Claims, 5 Drawing Sheets

216 ↘

| TOR SWITCH: SERVER MANAGEMENT IP (203) | TOR SWITCH: SERVER MANAGEMENT MAC (205) | SERVER MACS (207) | SERVER IP'S (211) | USER COMPUTING DEVICE IP'S (213) | LAST ACCESSED (215) | USER (217) |
|---|---|---|---|---|---|---|
| 15.212.32.32 | aa:bb:cc:dd:ee:ff | 02:1b:a8:9c:ab:92<br>0a:e2:b1:d6:9b:f9<br>de:73:f4:41:31:93 | 10.10.20.3<br>20.20.20.3<br>30.30.30.3 | 15.23.43.32 | Fri Jun 29<br>14:45:40 IST 2018 | user1@domain.com |
|  |  |  |  | 18.34.43.55 | Thu Jul 13<br>09:08:34 IST 2017 | user2@domain.com |
|  |  |  |  |  |  |  |
|  |  |  |  |  |  |  |
| 15.212.32.34 | bb:cc:dd:ee:ff:aa | 5e:3f:18:fb:35:db<br>ba:45:97:a8:5f:84<br>ce:41:19:a2:ad:13 | 10.10.20.4<br>20.20.20.4<br>30.30.30.4 | 18.34.43.56 | Thu Jul 13<br>10:08:56 IST 2017 | user4@domain.com |
|  |  |  |  |  |  |  |
|  |  |  |  |  |  |  |
|  |  |  |  |  |  |  |
| 17.21.32.66 | cc:dd:ee:ff:aa:bb | 9e:43:37:85:73:60<br>fe:e0:15:80:c2:68<br>3e:e0:c0:fd:51:b0 | 10.10.20.5<br>20.20.20.5<br>30.30.30.5 | 15.23.43.33 | Wed Aug 15<br>09:08:34 IST 2017 | User5@domain.com |

FIG. 2

SERVER ACCESS TIMES

BACKGROUND

Data centers can include computing systems, as well as associated components, power supply infrastructure, and/or data communications connections. Some data centers may include servers for use by users. For example, a data center can include an amount of computing resources that servers are able to allocate to users such that users can utilize the servers' computing technology for various purposes.

BRIEF DESCRIPTION OF THE DRAWINGS

FIG. 2 illustrates an example user mapping table consistent with the disclosure.

DETAILED DESCRIPTION

Servers in a data center may be allocated to users for indefinite periods of time. As used herein, the term "data center" refers to a group of networked computing systems which can be utilized for remote storage, processing, and/or distribution of processing and/or data. For example, a user may be allocated a server for research or other purposes. The user may utilize the server to save data, perform data analysis, run software, etc.

Some data centers may be very large. For example, an administrator of a data center may not have knowledge of all of the server allocations of the servers included in the data center.

Some allocated servers may be continually used by users. However, in some instances, servers allocated to users may begin to be underutilized. In some cases, a data center administrator may not have knowledge of allocated servers that are being used and allocated servers which are not being used. For example, a user allocated a server may finish tasks utilizing the allocated server and stop using the allocated server. In the case of allocated but unused servers, the data center may experience costs due to the server operating but being unused.

As described above, a data center administrator of a data center may not have knowledge of all server allocations from a data center. Accordingly, the data center administrator may have to manually contact users of allocated servers to determine whether the user is utilizing the server. Manual determination of server use can be time consuming and laborious.

Server access times, according to the disclosure, can allow for automation of server use determination by determining a time a user computing device last accessed a server. According to examples of the disclosure, server access times can utilize existing data center infrastructure to determine a time a user computing device last accessed a server and monitor an amount of time that has elapsed since the last accessed time. If a sufficient amount of time has elapsed since a user has accessed an allocated server, action may be taken. In some circumstances, a server may be reallocated. Accordingly, server access times according to the disclosure can prevent an administrator from manually determining whether server use is occurring and can reduce idle time of servers in a data center, thereby preserving data center resources and providing potential cost savings to the data center.

Figure 1:
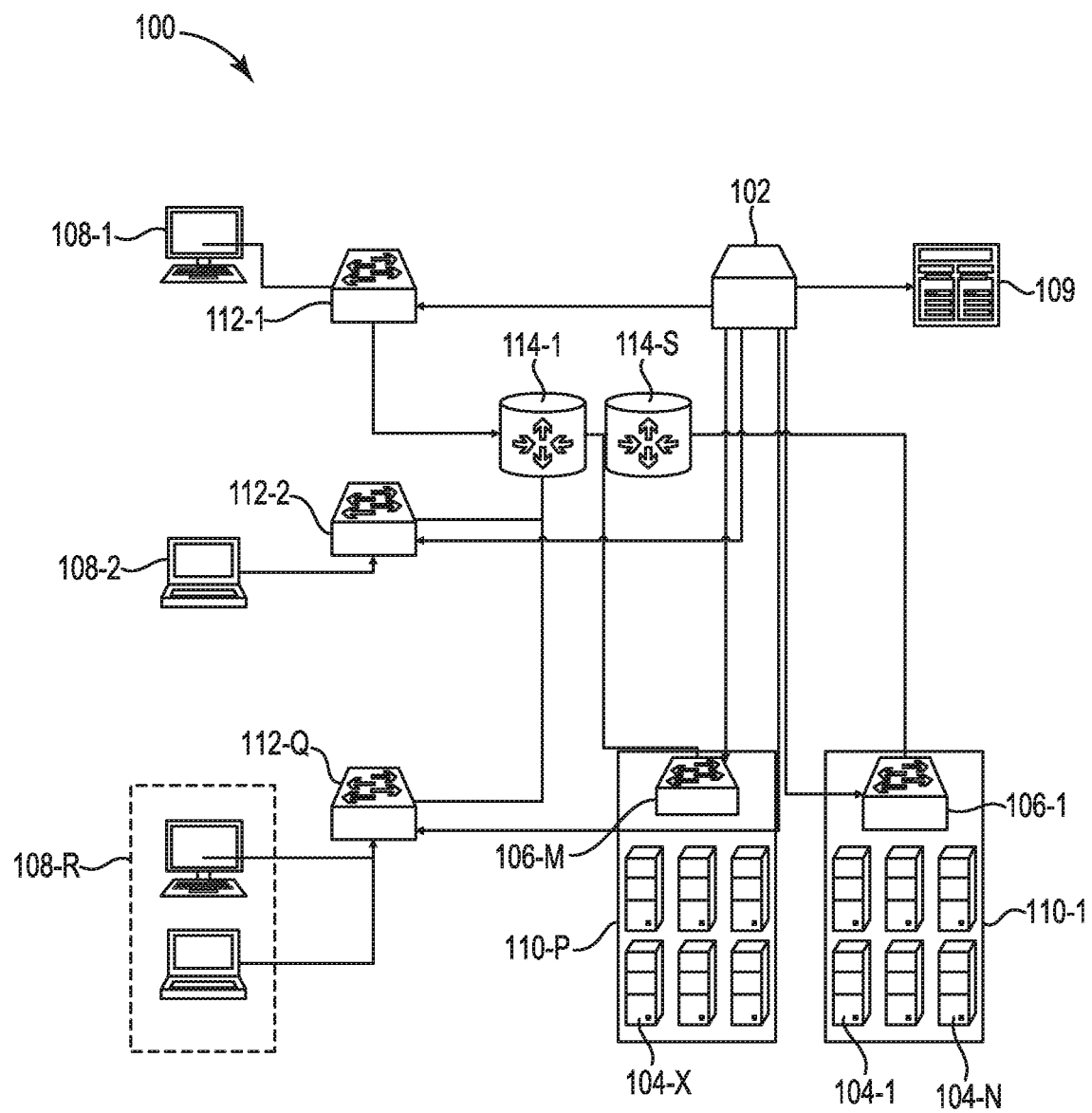
FIG. 1 illustrates an example system consistent with the disclosure.

FIG. 1 illustrates an example system 100 consistent with the disclosure. As illustrated in FIG. 1, the system 100 can include computing device 102, server 104, top of rack (TOR) switch 106, user computing device 108, predetermined database 109, server rack 110, switch 112, and router 114.

As used herein, the designators "M", "N", "P", "Q", "R", "S", and/or "X", particularly with respect to reference numerals in the drawings, indicate that a plurality of the particular feature so designated can be included with examples of the disclosure. For example, TOR switches 106-M can indicate system 100 can include a plurality of TOR switches, servers 104-N/servers 104-X can indicate system 100 can include a plurality of servers where a plurality of servers 104-N and a plurality of servers 104-X can be a same or a different plurality of servers, server rack 110-P can indicate system 100 can include a plurality of server racks, switches 112-Q can indicate system 100 can include a plurality of switches, user computing devices 108-R can indicate system 100 can include a plurality of user computing devices, and/or routers 114-S can indicate system 100 can include a plurality of routers. The designators can represent the same or different numbers of the particular features. The plurality of TOR switches 106-M, servers 104-N, server racks 110-P, switches 112-Q, user computing devices 108-R, and routers 114-S can be referred to generally herein as TOR switch 106, server 104, server rack 110, switch 112, user computing device 108, and router 114, respectively.

System 100 can include computing device 102. As used herein, the term "computing device" can, for example, refer to a device including a processor, memory, and input/output interfaces for wired and/or wireless communication. A computing device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Computing device 102 can be utilized to log a time a user computing device 108 last accessed a server 104, as is further described herein. As used herein, the term "server" refers to a computing program or device that provides functionality for other programs or devices (e.g., clients). For example, a server 104 can provide functionality, including providing computing resources such as processing and/or storage functionality, among other types of computing resources, to a user computing device 108.

User computing device 108 and server 104 can be connected via a network relationship. As used herein, the term "network relationship" can, for example, refer to a local area network (LAN), a wireless local area network (WLAN), a virtual local area network (VLAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

As described above, computing device 102 can determine a time user computing device 108 last accessed a server 104. For example, user computing device 108-1 may be allocated server 104-1. User computing device 108-1 may utilize server 104-1 for various purposes (e.g., computing resources, storage, etc.) It can be beneficial to log a time the user computing device 108-1 last accessed server 104-1 to determine whether the user computing device 108-1 is still utilizing server 104-1, as is further described herein.

In order to determine a time the user computing device 108-1 last accessed server 104-1, computing device 102 can parse a predetermined server configuration file to locate a server. For example, computing device 102 can parse a predetermined server configuration file to locate server 104-1. As used herein, the term "server configuration file" refers to a data file including information about servers included in a data center. For example, the predetermined server configuration file can include data and/or information about servers 104-N included in system 100.

Information about servers 104-N included in system 100 can include internet protocol (IP) addresses, media access control (MAC) addresses, access credentials, among other information. As used herein, the term "IP address" refers to a numerical label assigned to a device connected to a computer network that uses the Internet Protocol for communication. As used herein, the term "MAC address" refers to a unique device identifier.

While the information about the servers included in the data center included in the server configuration file may include IP addresses, MAC addresses, access credentials, and/or other information, the server configuration file does not include access times, including a last accessed time and/or duration of access by a user computing device 108. Accordingly, computing device 102 can perform actions as described herein to determine the last accessed time.

The predetermined server configuration file can be created by an administrator of a data center. For example, an administrator of a data center including servers 104-N can create a predetermined server configuration file. A predetermined server configuration file is illustrated below as Table 1.

TABLE 1

Predetermined Server Configuration File

|  | User | Password |
| --- | --- | --- |
| Server Management IP | | |
| 15.212.32.32 | User-1 | Pass-1 |
| 15.212.32.34 | User-2 | Pass-2 |
| 17.21.32.66 | User-3 | Pass-3 |
| Deleted Servers | | |
| 17.21.32.78 | | |
| 17.21.32.89 | | |
| TOR SWITCH Management IP | | |
| 15.212.32.45 | TOR-user-1 | Pass-1 |
| 15.212.32.56 | TOR-user-1 | Pass-1 |
| 15.212.32.76 | TOR-user-1 | Pass-1 |
| L2 Switches (Switches 112) Management IP | | |
| 16.202.32.44 | L2-user-1 | Pass-1 |
| 16.202.32.45 | L2-user-1 | Pass-1 |

As seen above, Table 1 can include various IP addresses and login credentials of servers 104, TOR switches 106, and switches 112 included in system 100. For example, Table 1 can include management IP addresses, usernames, and passwords for TOR switches 106-M, management IP addresses, usernames, and passwords for switches 112, and IP addresses, usernames, and passwords for servers 104-N. Further, although Table 1 is illustrated as including three server IPs, usernames, and passwords, examples of the disclosure are not so limited. For example, Table 1 can include all of the server IPs, usernames, and passwords for servers 104-N included in system 100.

Computing device 102 can parse Table 1 to begin to generate a user mapping table. The user mapping table can include various information including IP and MAC addresses of servers 104, user computing device IP addresses, a last accessed time of the user computing devices of the servers 104, as well as user identification information of the user computing devices, as is further described in connection with FIG. 2.

Computing device 102 can parse the predetermined server configuration file illustrated above in Table 1 to locate a particular server. For example, computing device 102 can parse Table 1 to determine IP address information of server 104-1, MAC address information of server 104-1, and login credentials for server 104-1, as is further described herein.

As illustrated in FIG. 1, server 104-1 can be included in a server rack 110. As used herein, the term "server rack" refers to a physical frame/enclosure for mounting multiple electronic equipment modules. For example, server rack 110 can be a mounting frame to mount a plurality of servers, as well as other associated components such as power supply infrastructure and/or data communications connections, etc.

Server 104-1 can be allocated to user computing device 108-1. For example, user computing device 108-1 may have server 104-1 allocated to it for running software, saving data, etc.

Server 104-1 can be connected to user computing device 108-1 via TOR switch 106-1. As used herein, the term "TOR switch" refers to a network switch that can be connected to computing infrastructure located in a server rack. For example, the plurality of servers 104-N located in server rack 110-1, as well as other associated components such as power supply infrastructure and/or data communication equipment, can be connected to TOR switch 106-1 and can communicate to user computing devices 108-R through TOR switch 106-1 via a network relationship, as is further described herein.

Computing device 102 can determine a MAC address of server 104-1. For example, computing device 102 can log in to server 104-1 utilizing the login credentials of server 104-1 and TOR switch 106-1. For example, utilizing management IP address of TOR switch 106-1 and IP address of server 104-1, usernames of TOR switch 106-1 and server 104-1, and passwords for TOR switch 106-1 and server 104-1, computing device 102 can determine the MAC address of server 104-1.

In some examples, servers 104 may include more than one MAC address. For example, server 104-1 may include three MAC addresses. Computing device 102 can log in to server 104-1 and determine each of the MAC addresses for server 104-1. For example, computing device 102 can log in to server 104-1 and determine that server 104-1 has the following MAC addresses: "02:1b:a8:9c:ab:92", "0a:e2:b1:d6:9b:f9", and "de:73:f4:41:31:93".

Although server 104-1 is described above as including three MAC addresses, examples of the disclosure are not so limited. For example, server 104-1 can include less than three MAC addresses or more than three MAC addresses.

Computing device 102 can poll TOR switch 106-1 to capture a packet. As used herein, the term "poll" refers to sampling ports of a network device. As used herein, the term "packet" refers to a formatted unit of data carried by a packet-switched network. For example, computing device 102 can poll TOR switch 106-1 to capture a packet being communicated through TOR switch 106-1, where the packet includes various data.

The various data included in the packet can include a source IP address of the packet as well as timing information. In some examples, the packet can include a destination MAC address of the packet. For example, as user computing device 108-1 accesses server 104-1, packets are communicated from user computing device 108-1, through switch 112-1, through router 114-1, to TOR switch 106-1, and finally to server 104-1. Accordingly, computing device 102 can poll TOR switch 106-1 to capture a packet communicated from user computing device 108-1. As used herein, the term "switch" refers to a computer networking device that connects devices together on a network by using, for example, packet switching to receive, process and forward data to a destination device. As used herein, the term "router" refers to a networking device that forwards data packets between networks.

Computing device 102 can poll TOR switch 106-1 using sampled flow (sFlow). As used herein, the term "sFlow" refers to an industry standard packet export at Layer 2 of the Open Systems Interconnection (OSI) model. However, examples of the disclosure are not limited to polling TOR switch 106-1 using sFlow. For example, computing device 102 can poll TOR switch 106-1 using any other mechanism for packet export.

As described above, the captured packet can include various information. For example, the packet can include a source IP address, a destination IP address, and a destination MAC address, timing information among other types of information. Since the packet is communicated from user computing device 108-1, the source IP address can correspond to the IP address of user computing device 108-1, and the destination IP address and destination MAC address can correspond to the IP address and MAC address of server 104-1.

Computing device 102 can determine a source MAC address using the source IP address. For example, computing device 102 can poll an address resolution protocol (ARP) table of switch 112-1. As used herein, the term "ARP" refers to a protocol to map an IP address to a physical machine address included in a network. For example, computing device 102 can poll the ARP table of switch 112-1 to determine the source MAC address of user computing device 108-1 by mapping the source IP address (e.g., included in the captured packet) with an IP address included in the ARP table of switch 112-1. Based on the IP addresses matching, computing device 102 can further determine the MAC address corresponding to the matching IP address included in ARP table of switch 112-1. In other words, by matching the source IP address included in the captured packet from TOR switch 106-1 with an IP address having an associated MAC address included in the ARP table of switch 112-1, computing device 102 can map the source IP address included in the captured packet to a source MAC address (e.g., of user computing device 108-1) to determine the source MAC address. Computing device 102 can access the ARP table of switches 112 using the login information included in the predetermined server configuration file (e.g., Table 1).

Computing device 102 can poll the ARP table of switches 112 due to a source MAC address in a packet being transmitted through switches 112 being changed. For instance, as a packet moves through a router 114, the router 114 can change the source MAC address of the packet to the router interface MAC address. However, the router does not change the source IP address. Accordingly, computing device 102 can map the source IP address to the MAC address of user computing device 108 using the source IP address of the user computing device 108.

In some example computing networks, such as a local area network (LAN), a MAC address in a packet being transmitted to servers 110 may not change if the servers 110 are in the same LAN. In such an example, computing device 102 can determine a source MAC address using the source IP address by polling an ARP table of a TOR switch 106. For example, computing device 102 can poll an ARP table of TOR switch 106-1 to determine the source MAC address of user computing device 108-1 by mapping the source IP address (e.g., included in the captured packet) with an IP address included in the ARP table of TOR switch 106-1. Based on the IP addresses matching, computing device 102 can further determine the MAC address corresponding to the matching IP address included in ARP table of TOR switch 106-1. In other words, by matching the source IP address included in the captured packet from TOR switch 106-1 with an IP address having an associated MAC address included in the ARP table of TOR switch 106-1, computing device 102 can map the source IP address included in the captured packet to a source MAC address (e.g., of user computing device 108-1) to determine the source MAC address.

Computing device 102 can utilize the source MAC address to determine an identity of user computing device 108-1. Since the destination MAC address corresponds to server 104-1 and the source MAC address included in the captured packet corresponds to the user computing device 108-1, computing device 102 can utilize the source MAC address to determine an identity of user computing device 108-1, as is further described herein. For example, the determined MAC address of computing device 102 can be "aa:bb:cc:dd:ee:ff".

Computing device 102 can utilize the source MAC address to determine an identity of user computing device 108-1 rather than the source IP address. For example, since an IP address can change over time, it may not be as desirable to use to determine an identity of user computing device 108-1. However, a MAC address of user computing device 108-1 may not change, and as a result, may be more desirable to use to determine an identity of user computing device 108-1.

Once computing device 102 has the source MAC address from the captured packet at TOR switch 106-1, computing device 102 can compare the source MAC address to a predetermined database 109. The predetermined database 109 can include MAC addresses for user computing devices 108-R in system 100.

In some examples, the predetermined database 109 can be a lightweight directory access protocol (LDAP). As used herein, the term "LDAP" refers to a standard application protocol to access and maintain distributed directory information services over an IP network. An example LDAP entry for user computing device 108-1 is shown below:

dn: cn=test user,dc=example,dc=com
cn: test user
givenName: user-1
sn: test
telephoneNumber: +1 888 555 5555 telephoneNumber: +1 888 555 1234
MAC: aa:bb:cc:dd:ee:ff
mail: user-1@exampledomain.com
manager: cn=test manager,dc=example,dc=com
objectClass: testOrgPerson
objectClass: testPerson
objectClass: person
objectClass: top For example, as illustrated above, the MAC address included in LDAP 109 above for user computing device 108-1 can be "aa:bb:cc:dd:ee:ff". By comparing the source MAC address included in the packet at TOR switch 106-1 (e.g., "aa:bb:cc:dd:ee:ff") with the MAC address included in LDAP 109 (e.g., "aa:bb:cc:dd:ee:ff"), computing device 102 can determine an identity of user computing device 108-1. For example, based on the LDAP 109 entry above, computing device 102 can determine the user is "user-1" having the email address "user-1@exampledomain.com", and can include other various information such as a contact phone number, etc.

As described above, the captured packet can include timing information. For example, the timing information of the packet can include date and time information of the packet. For example, the date and time of the captured packet can be "Fri June 29, 14:45:40 EST 2018", indicating the packet was sent from user computing device 108-1 to server 104-1 on Jun. 29, 2018 at 14:45:40 EST. Correspondingly, the date and time of the captured packet can indicate when the user computing device 108-1 last accessed server 104-1.

Computing device 102 can log, based on the time included in the captured packet, the time user computing device 108-1 last accessed server 104-1. For example, computing device 102 can log the time (e.g., Jun. 29, 2018 at 14:45:40 EST) the user computing device 108-1 last accessed server 104-1 in the user mapping table.

In addition to the time user computing device 108-1 last accessed server 104-1, the user mapping table can include the IP and MAC addresses of each of the plurality of servers 104-N, the IP addresses of users of each of the plurality of servers, a last accessed time of user computing devices 108-R of each of the plurality of servers 104-N, and user identification information corresponding to each of the user computing devices 108-R, as is further described in connection with FIG. 2. For example, although system 100 is described above as computing device 102 determining a last accessed time of user computing device 108-1 of server 104-1, examples of the disclosure are not so limited. Server access times, according to the disclosure, can allow computing device 102 to generally determine a last accessed time of any one of user computing devices 108-R of any one of servers 104-N.

The above described steps can be performed at predetermined intervals. For example, computing device 102 can capture packets and log times user computing devices 108-R last accessed servers 104-N at a predetermined interval. The predetermined interval can be every hour, every day, every week, among other time intervals. Further, the predetermined time interval can be modified to be any other interval.

In some examples, computing device 102 can generate a notification to user computing device 108. For example, in response to an amount of time since user computing device 108 last accessed server 104 exceeding a threshold amount of time, computing device 102 can generate a notification to user computing device 108. For instance, in response to 30 days elapsing between the last time a user of user computing device 108-1 accessed server 104-1 and a present time, computing device 102 can generate and transmit a notification to user computing device 108-1. The notification can include a query about whether a user of the user computing device 108 is still utilizing server 104, is finished using server 104, etc. Although the threshold amount of time is described above as being 30 days, examples of the disclosure are not so limited. For example, the threshold amount of time can be one day, one week, one month, etc. The threshold amount of time can be modified to be any amount of time. The notification may be transmitted to an email address of a user of user computing device 108, transmitted via text message to a mobile device of the user of user computing device 108, transmitted via a phone call to a device of the user of user computing device 108, among other methods of transmission. The contact information utilized for the notification to the user may be included in LDAP 109.

In some examples, computing device 102 can re-allocate server 104 from user computing device 108. For example, in response to an amount of time since user computing device 108 last accessed server 104 exceeding a threshold amount of time, computing device 102 can re-allocate server 104 to a different user computing device 108. For instance, in response to 30 days elapsing between the last time a user of user computing device 108-1 accessed server 104-1 and a present time, computing device 102 can re-allocate server 104-1 to user computing device 108-2. Although the threshold amount of time is described above as being 30 days, examples of the disclosure are not so limited. For example, the threshold amount of time can be one day, one week, one month, etc. The threshold amount of time can be modified to be any amount of time.

Server access times according to the disclosure can allow for determination of times a user computing device last accessed a server allocated to the user computing device. Determining a last accessed time can allow for a determination of an amount of time elapsed between a present time and the time the user computing device last accessed the server. If a sufficient amount of time has been passed, it may indicate a user of the user computing device is finished utilizing the server and an action may be taken to prevent the server from being idle. This can prevent an administrator of a data center having many servers from manually determining a last accessed time of servers. Further, an administrator may be able to perform actions on a server without disrupting a user's access to the server. For example, an administrator may be able to re-image the server and re-install an operating system without disrupting a user's access to the server or having to manually contact the user. Accordingly, server access times can reduce idle times of servers in a data center, which can preserve data center resources and provide cost savings to a data center.

FIG. 2 illustrates an example user mapping table 216 consistent with the disclosure. As illustrated in FIG. 2, user mapping table 216 includes server management IP addresses 203, server management MAC addresses 205, server MAC addresses 207, server IP addresses 211, user IP addresses 213, last access times 215, and user identification information 217.

As previously described in connection with FIG. 1, a computing device can parse a predetermined server configuration file to obtain various information including management IP addresses, usernames, and passwords for TOR switches and IP addresses, usernames, and passwords for servers. The computing device can further determine MAC addresses for the servers and the TOR switches by logging in to the servers using the usernames and passwords determined above. Computing device can generate the mapping table having the server management IP addresses of the TOR switches, the server management MAC addresses of the TOR switches, the server MAC addresses, and the server IP addresses.

Additionally, as previously described in connection with FIG. 1, the computing device can determine user computing device IP addresses and user computing device MAC addresses by capturing packets being transmitted through TOR switches. As illustrated in FIG. 2, the determined user computing device IP addresses can be included in the user mapping table 216. Further, although not illustrated in FIG. 2 for clarity and so as not to obscure examples of the disclosure, the computing device can include the determined user computing device MAC addresses in the user mapping table 216.

The computing device can determine a last accessed time of the user computing devices for each of the plurality of servers included in the user mapping table 216 using the captured packets, as previously described in connection with FIG. 1, as well as user identification information of the user computing devices. The last accessed time and user identification information may be included in user mapping table 216.

For example, as illustrated in FIG. 2, a server having the MAC addresses "02:1b:a8:9c:ab:92", "0a:e2:b1:d6:9b:f9", and "de:73:f4:41:31:93" may be allocated to two different users having two different user computing devices. For example, the first user may have a user computing device IP address of 15.23.43.32 and user identification information of "user1@domain.com", and last accessed the server at Friday, Jun. 29, 2018, at 14:45:40 EST. Further the second user may have a user computing device IP address of 18.34.43.55 and user identification information of "user2@domain.com", and last accessed the server at Thursday, Jul. 13, 2018, at 09:08:34 EST. Similar information can be included in user mapping table 216 for other servers.

As illustrated in user mapping table 216, the user having the user computing device IP address of 15.23.43.32 may not have accessed the server in some time. For example, if a present time is Aug. 28, 2018, it can be apparent that the user having the user computing device IP address of 15.23.43.32 has not accessed the server in over one month. Accordingly, action may be taken regarding the server and the user having the user computing device IP address of 15.23.43.32, as previously described in connection with FIG. 1 (e.g., generation of a notification, re-allocating the server to another user, etc.)

In some examples, a server included in a server rack may be removed. For example, the server may undergo maintenance, be replaced, etc. In such an example, the server may be deleted from the active server list in the predetermined server configuration file and moved to a "Deleted Servers" section of the predetermined server configuration file. For example, as illustrated in Table 1 above, a server having an IP address of 17.21.32.78 may be moved to the Deleted Servers section of the predetermined server configuration file.

In order to prevent the computing device from trying to determine a last accessed time for a removed server, the computing device can parse the deleted server list for deleted servers. In response to finding deleted servers, the computing device can remove the deleted server from the user mapping table 216. Removing the deleted server from user mapping table 216 can prevent deleted servers from being monitored according to examples of the disclosure.

Figure 3:
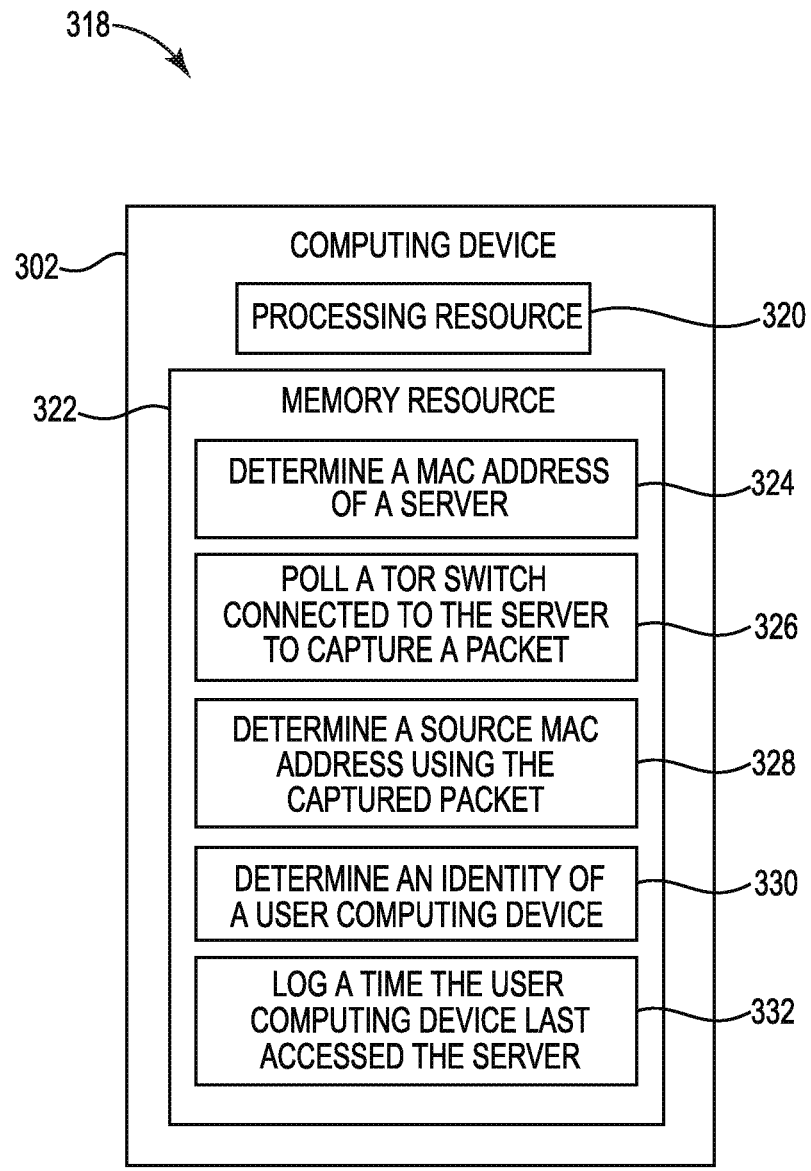
FIG. 3 is a block diagram of an example computing device for server access times consistent with the disclosure.

FIG. 3 is a block diagram 318 of an example computing device 302 for server access times consistent with the disclosure. As described herein, the computing device 302 may perform a number of functions related to server access times. Although not illustrated in FIG. 3, the computing device 302 may include a processor and a machine-readable storage medium. Although the following descriptions refer to a single processor and a single machine-readable storage medium, the descriptions may also apply to a system with multiple processors and multiple machine-readable storage mediums. In such examples, the computing device 302 may be distributed across multiple machine-readable storage mediums and the computing device 302 may be distributed across multiple processors. Put another way, the instructions executed by the computing device 302 may be stored across multiple machine-readable storage mediums and executed across multiple processors, such as in a distributed or virtual computing environment.

As illustrated in FIG. 3, the computing device 302 may comprise a processing resource 320, and a memory resource 322 storing machine-readable instructions to cause the processing resource 320 to perform a number of operations relating to server access times. That is, using the processing resource 320 and the memory resource 322, the computing device 302 may log a time a user computing device last accessed a server, among other operations. Processing resource 320 may be a central processing unit (CPU), microprocessor, and/or other hardware device suitable for retrieval and execution of instructions stored in memory resource 322.

The computing device 302 may include instructions 324 stored in the memory resource 322 and executable by the processing resource 320 to determine a MAC address of a server. The computing device 302 may determine a MAC address of a server by parsing a predetermined server configuration file. The computing device 302 can parse the predetermined server configuration file to determine a TOR switch management IP address, username, and password for the TOR switch, as well as an IP address, username, and password for the server. The computing device 302 can then login to the server to determine the MAC address of the server utilizing the TOR switch management IP address, username, and password for the TOR switch, as well as the IP address, username, and password for the server.

The computing device 302 may include instructions 326 stored in the memory resource 322 and executable by the processing resource 320 to poll the TOR switch connected to the server to capture a packet. The packet can include a source IP address of the packet, as well as timing information.

The computing device 302 may include instructions 328 stored in the memory resource 322 and executable by the processing resource 320 to determine a source MAC address using the captured packet. For example, since the captured packet includes a source IP address, computing device 302 can poll a particular switch to access an ARP table. In some examples, the switch is a network switch. In some examples, the switch is a TOR switch. The computing device 302 can utilize the ARP table to compare a source IP address included in the captured packet with IP addresses included in the ARP table. The computing device 302 can match the source IP address included in the captured packet to an IP address and corresponding MAC address included in the ARP table. Based on the matching IP addresses, the computing device 302 can determine the MAC address corresponding to the matching IP address in the ARP table is the source MAC address of the user computing device. Since the user computing device communicates the packet when accessing the server, the source IP address can correspond to the user computing device. Accordingly, the computing device 302 can determine the source MAC address of the user computing device.

The computing device 302 may include instructions 330 stored in the memory resource 322 and executable by the processing resource 320 to determine an identity of the user computing device. The computing device 302 can compare the source MAC address to a predetermined database that includes MAC addresses. For example, the computing device 302 can compare the source MAC address to an LDAP that includes MAC addresses of all user computing devices on the network. Accordingly, computing device 302 can determine, based on a source MAC address matching a MAC address in the LDAP, the identity of the user computing device sending the captured packet.

The computing device 302 may include instructions 332 stored in the memory resource 322 and executable by the processing resource 320 to log a time the user computing device last accessed the server. For example, as previously described above, the captured packet can include timing information. The timing information can include a date and time, which can correspond to the time the user computing device last accessed the server. This time can be logged in a user mapping table.

In this manner, the computing device 302 can determine a last accessed time of a server by a user computing device. Accordingly, server access times, according to the disclosure can track an amount of time since a user last accessed a server, which can reduce server idle times.

Figure 4:
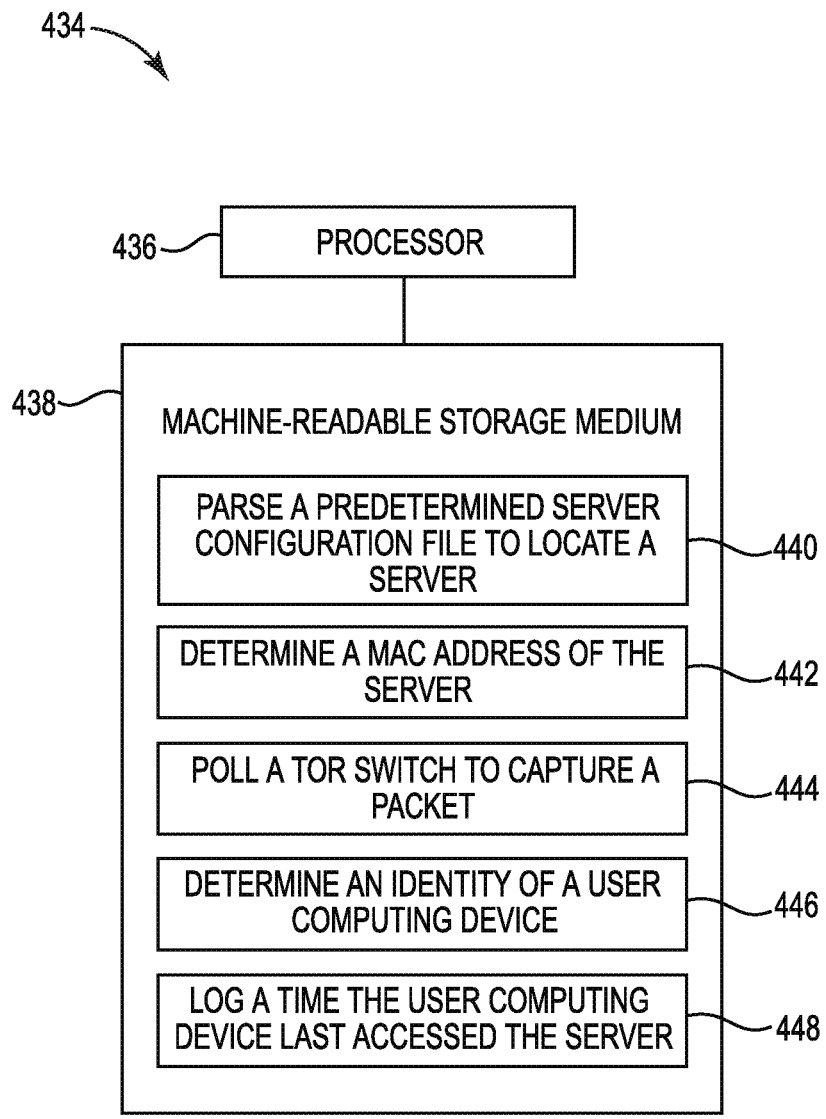
FIG. 4 is a block diagram of an example system consistent with the disclosure.

FIG. 4 is a block diagram of an example system 434 consistent with the disclosure. In the example of FIG. 4, system 434 includes a processor 436 and a machine-readable storage medium 438. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 436 may be a central processing unit (CPU), microprocessor, and/or other hardware device suitable for retrieval and execution of instructions stored in machine-readable storage medium 438. In the particular example shown in FIG. 4, processor 436 may receive, determine, and send instructions 440, 442, 444, 446, and 448. As an alternative or in addition to retrieving and executing instructions, processor 436 may include an electronic circuit comprising a number of electronic components for performing the operations of the instructions in machine-readable storage medium 438. With respect to the executable instruction representations or boxes described and shown herein, it should be understood that part or all of the executable instructions and/or electronic circuits included within one box may be included in a different box shown in the figures or in a different box not shown.

Machine-readable storage medium 438 may be any electronic, magnetic, optical, or other physical storage device that stores executable instructions. Thus, machine-readable storage medium 438 may be, for example, Random Access Memory (RAM), an Electrically-Erasable Programmable Read-Only Memory (EEPROM), a storage drive, an optical disc, and the like. The executable instructions may be "installed" on the system 434 illustrated in FIG. 4. Machine-readable storage medium 438 may be a portable, external or remote storage medium, for example, that allows the system 434 to download the instructions from the portable/external/remote storage medium. In this situation, the executable instructions may be part of an "installation package". As described herein, machine-readable storage medium 438 may be encoded with executable instructions for server access times.

Parse instructions 440, when executed by a processor such as processor 436, may cause system 434 to parse a predetermined server configuration file to locate a server. For example, system 434 can parse the predetermined server configuration file to determine a TOR switch management IP address, username, and password for the TOR switch, as well as an IP address, username, and password for the server.

Determine instructions 442, when executed by a processor such as processor 436, may cause system 434 to determine a MAC address of the server by logging into the server. The system 434 can log in to the server utilizing the login credentials of the server and TOR switch connected to the server. For example, the system 434 can log in to the server utilizing the TOR switch management IP address, username, and password for the TOR switch, as well as the IP address, username, and password for the server to determine the MAC address of the server.

Poll instructions 444, when executed by a processor such as processor 436, may cause system 434 to poll the TOR switch connected to the server to capture a packet. The packet can include a source IP address of the packet, as well as timing information.

Determine instructions 446, when executed by a processor such as processor 436, may cause system 434 to determine an identity of a user computing device. The system 434 can determine the identity of the user computing device based on the source IP address from the captured packet. For example, since the captured packet includes a source IP address, the system 434 can poll a particular switch to access an ARP table. In some examples, the switch is a network switch. In some examples, the switch is a TOR switch. The system 434 can utilize the ARP table to compare the source IP address included in the captured packet with IP addresses included in the ARP table. The system 434 can match the source IP address included in the captured packet to an IP address and corresponding MAC address included in the ARP table. Based on the matching IP addresses, the system 434 can determine the MAC address corresponding to the matching IP address in the ARP table is the source MAC address of the user computing device.

To determine an identity of the user computing device, system 434 can compare the source MAC address to a predetermined database that includes MAC addresses. The system 434 can compare the source MAC address to an LDAP that includes MAC addresses of all user computing devices on the network. Accordingly, the system 434 can determine, based on a source MAC address matching a MAC address in the LDAP, the identity of the user computing device sending the captured packet.

Log instructions 448, when executed by a processor such as processor 436, may cause system 434 to log a time the user computing device last accessed the server. For example, as previously described above, the captured packet can include timing information. The timing information can include a date and time, which can correspond to the time the user computing device last accessed the server. This time can be logged in a user mapping table.

Figure 5:
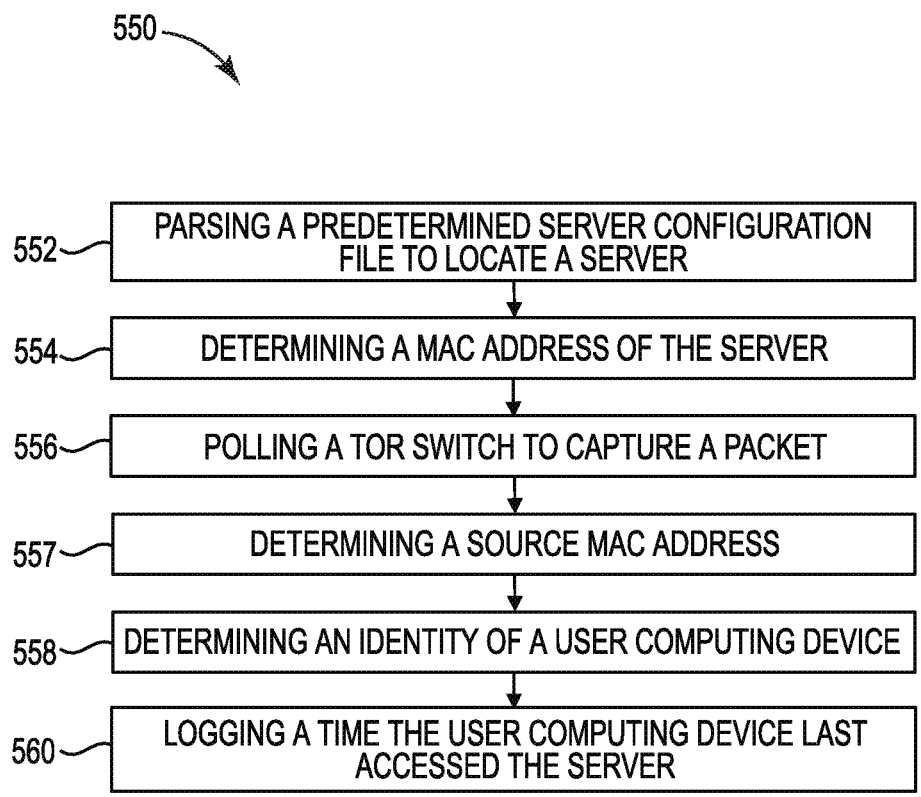
FIG. 5 illustrates an example method consistent with the disclosure.

FIG. 5 illustrates an example method 550 consistent with the disclosure. Method 550 may be performed, for example, by a computing device (e.g., computing device 102, 302, previously described in connection with FIGS. 1 and 3, respectively).

At 552, the method 550 includes parsing a predetermined server configuration file to locate a server. A computing device can parse a predetermined server configuration file to locate a server among a plurality of servers included in a server rack. The predetermined server configuration file can include IP addresses and login credentials for each server in the server rack, and an IP address and login credentials for a TOR switch(es) of the server rack. For example, the computing device can parse the predetermined server configuration file to determine a TOR switch management IP address, username, and password for the TOR switch, as well as an IP address, username, and password for the server among the plurality of servers.

At 554, the method 550 includes determining a MAC address of the server. The computing device can determine the MAC address of the server by logging in to the server utilizing the login credentials of the server and the TOR switch. For example, the computing device can login to the server utilizing the TOR switch management IP address, username, and password for the TOR switch, as well as the IP address, username, and password for the server to determine the MAC address of the server.

At 556, the method 550 includes polling a TOR switch to capture a packet. The captured packet can include a source IP address, as well as timing information.

At 557, the method 550 includes determining a source MAC address. The computing device can determine the source MAC address using the source IP address included in the captured packet. For example, computing device can poll a particular switch to access an ARP table. In some examples, the switch is a network switch. In some examples, the switch is a TOR switch. The computing device can utilize the ARP table to compare the source IP address included in the captured packet with IP addresses included in the ARP table. The computing device can match the source IP address included in the captured packet to an IP address and corresponding MAC address included in the ARP table. Based on the matching IP addresses, the computing device can determine the MAC address corresponding to the matching IP address in the ARP table is the source MAC address of the user computing device.

At 558, the method 550 includes determining an identity of a user computing device. The computing device can determine the identity of the user computing device by comparing the source MAC address to an LDAP. Accordingly, the computing device can determine, based on the source MAC address matching a MAC address in the LDAP, the identity of the user computing device sending the captured packet.

At 560, the method 550 includes logging a time the user computing device last accessed the server. For example, as previously described above, the captured packet can include timing information. The timing information can include a date and time, which can correspond to the time the user computing device last accessed the server. This time can be logged in a user mapping table.

The method 550 can be performed at predetermined intervals. Performing method 550 at predetermined intervals can allow the user mapping table to be periodically updated as user computing devices access various servers. The user mapping table can be utilized by an administrator to track an amount of time since a user last accessed a server, which can reduce server idle times.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A computing device, comprising:
 a processing resource; and
 a memory resource storing non-transitory machine-readable instructions to cause the processing resource to:
  locate the server having the determined MAC address by parsing a predetermined server configuration file;
  determine a media access control (MAC) address of a server;
  poll a top of rack (TOR) switch connected to the server to capture a packet;
  determine a source MAC address using the captured packet;
  determine, based on the source MAC address, an identity of a user computing device; and
  log, based on a time included in the captured packet, a time the user computing device last accessed the server.

2. The computing device of claim 1, including instructions to cause the processing resource to determine:
 a management internet protocol (IP) address, username, and password of the TOR switch; and
 a username and password of the server.

3. The computing device of claim 2, including instructions to cause the processing resource to determine the MAC address of the server by logging in to the server utilizing:
 the management IP address, username, and password of the TOR switch; and
 the username and password of the server.

4. The computing device of claim 1, including instructions to cause the processing resource to determine the identity of the user computing device by comparing the source MAC address to a predetermined database.

5. The computing device of claim 4, wherein the predetermined database is a lightweight directory access protocol (LDAP).

6. The computing device of claim 1, including instructions to cause the processing resource to poll the TOR switch using sampled flow (sFlow).

7. The computing device of claim 1, wherein the predetermined server configuration file includes: the management IP address, username, and password of the TOR switch; and the IP address of the server, username, and password of the server.

8. The computing device of claim 1, wherein:
the server is included in a server rack having a plurality of servers; and
the TOR switch is connected to the plurality of servers.

9. A non-transitory computer readable medium storing instructions executable by a processing resource to cause the processing resource to:
parse a predetermined server configuration file to locate a server;
determine a media access control (MAC) address of the server by logging in to the server utilizing login credentials of:
the server; and
a top of rack (TOR) switch connected to the server;
poll the TOR switch connected to the server to capture a packet, wherein the packet includes a source internet protocol (IP) address and a destination IP address;
determine, based on the source IP address, an identity of a user computing device; and
log, based on a time included in the captured packet, a time the user computing device last accessed the server.

10. The medium of claim 9, wherein the server is allocated to the user computing device.

11. The medium of claim 10, including instructions to re-allocate the server from the user computing device in response to the time the user computing device last accessed the server exceeding a threshold amount of time.

12. The medium of claim 10, including instructions to generate a notification to the user computing device in response to the time the user computing device last accessed the server exceeding a threshold amount of time.

13. The medium of claim 9, including instructions to determine a source MAC address using the source IP address by polling an address resolution protocol (ARP) table of the TOR switch.

14. The medium of claim 9, including instructions to determine a source MAC address using the source IP address by polling an address resolution protocol (ARP) table of a switch connected to the user computing device.

15. A method, comprising:
parsing, by a computing device, a predetermined server configuration file to locate a server among a plurality of servers included in a server rack, wherein the predetermined server configuration file includes:
internet protocol (IP) addresses and login credentials for each server in the server rack; and
an IP address and login credentials of a top of rack (TOR) switch for the server rack;
determining, by the computing device, a media access control (MAC) address of the server by logging in to the server utilizing the login credentials of the server and the TOR switch;
polling, by the computing device, the TOR switch to capture a packet, wherein the packet includes a source IP address;
determining, by the computing device, a source MAC address using the source IP address;
determining, by the computing device, an identity of a user computing device by comparing the source MAC address to a lightweight directory access protocol (LDAP); and
logging, by the computing device based on a time included in the captured packet, a time the user computing device last accessed the server.

16. The method of claim 15, wherein the method includes logging the time the user computing device last accessed the server in a user mapping table, wherein the user mapping table includes at least one of:
IP and MAC addresses of each of the plurality of servers;
IP addresses of users of each of the plurality of servers;
a last accessed time of user computing devices of each of the plurality of servers; and
user identification information corresponding to each of the user computing devices.

17. The method of claim 16, wherein the method includes adding, in response to a particular server of the plurality of servers included in the predetermined server configuration file being deleted from the predetermined server configuration file, the deleted server to a deleted server list.

18. The method of claim 17, wherein the method includes:
parsing the deleted server list for the deleted server; and
removing the deleted server from the user mapping table.

19. The method of claim 15, wherein the method is performed at predetermined intervals.

* * * * *